Patented May 19, 1931

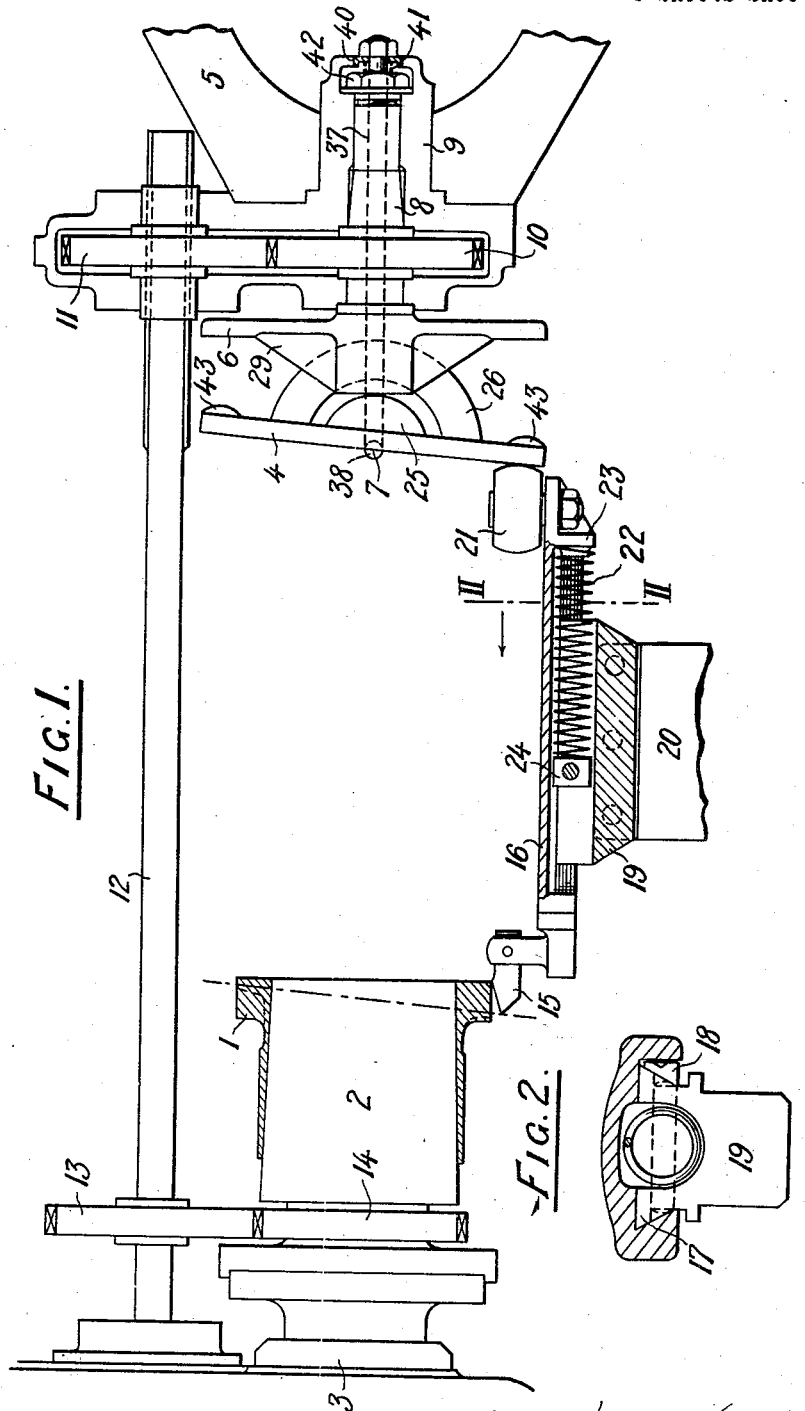

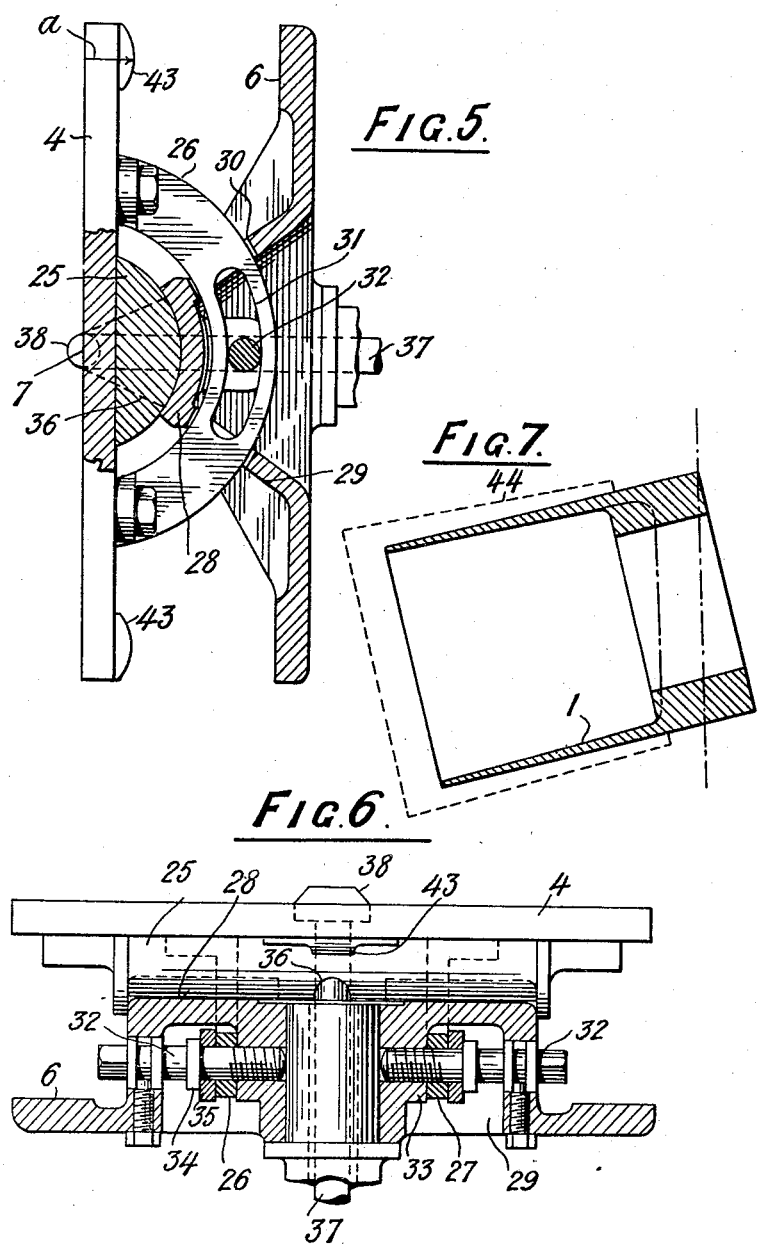

1,805,964

UNITED STATES PATENT OFFICE

BARNES NEVILLE WALLIS, OF WEYBRIDGE, ENGLAND

APPARATUS FOR TURNING INCLINED SURFACES

Application filed October 6, 1930, Serial No. 486,851, and in Great Britain September 26, 1929.

The invention relates to means for producing, by turning, strengthening sleeves for use with tubular members which form part of framed structures and which are particularly applicable in aircraft construction, in which the tubular members are too thin in gauge to permit of the ordinary attachment of the end of one tubular member to the end of another tubular member without the ends of such tubular members being strengthened by sleeves which distribute the stresses from one tubular member to an adjacent continuing tubular member, the sleeves having terminal flanges by which the tubular members are connected together. In such structures it is very desirable to be able to locate the tubular members at different angles relatively to each other in order that the structural profile can be shaped to a desired form and that the tubular members may be easily interconnected and also connected to other members, but difficulty has been experienced in accurately, quickly and cheaply making such strengthening sleeves with the terminal flanges at the various angles required.

The present invention provides a method of producing, by turning, such strengthening sleeves, this method consisting in setting up a sleeve blank and a former plate on parallel axes with the former plate angularly adjustable relatively to its axis, setting the former plate with its face at an angle to its axis corresponding to the required angle which the axis of the sleeve is to subtend to the plane of the terminal flange, then bringing into contact with the former plate a follower on a tool carrier which is free to reciprocate parallel to the axis of the former plate and rotating the former plate and sleeve blank synchronously relatively to the tool carrier and traversing the tool carrier across the former plate and sleeve blank while maintaining the tool in a position relative to the axis of the sleeve blank corresponding to the position of the follower relative to the axis of the former plate so that the tool is caused to cut a terminal flange at the required angle on the sleeve blank.

The means for carrying out this method comprises a work holder for carrying a sleeve blank from which the strengthening sleeve is to be made, a former plate mounted on an axis parallel with that of the sleeve blank and angularly adjustable relatively to its axis, so that its face can be set at an angle to its axis corresponding to the angle which the axis of the sleeve is to subtend to the plane of the terminal flange, a tool carrier adapted to be reciprocated parallel to the said axis of the former plate and sleeve blank by said former plate and means for rotating the sleeve blank and former plate synchronously relatively to the tool carrier and means for traversing the tool carrier across the sleeve blank and former plate while maintaining the tool in a position relative to the axis of the sleeve blank corresponding to the position of the tool carrier relative to the axis of the former plate.

In order that the strengthening sleeve as a whole can be quickly and accurately made the said means is combined with a turret lathe in which case the former plate is mounted on the turret so that it may be brought opposite to a sleeve blank shaped by the lathe from a piece of metal, said former plate being rotatable on an axis parallel to the axis of the sleeve blank and angularly adjustable relatively to said axis so that its face can be set at any one of various angles to its axis corresponding to the angle which the axis of the sleeve is to subtend to the plane of the terminal flange, means is provided for causing the former plate to rotate synchronously with the work holder of the lathe, and the tool carrier of the lathe is provided with means for mounting the cutting tool in such a manner that said means can be brought against the former plate and can be caused to reciprocate by the rotation of the former plate parallel to the said axis of the former plate and sleeve blank, and the tool can be maintained in a position relative to the axis of the sleeve blank corresponding to the position of said means relative to the former plate while being fed by the tool carrier across the former plate and sleeve blank. By this means a sleeve blank can be shaped from a piece of metal and then the terminal flange can be cut by operating the lathe in the usual way.

Strengthening sleeves with outwardly directed or inwardly directed flanges may be produced. In the case of outwardly directed terminal flanges these flanges may be formed with holes so that the terminal flange of one sleeve may be connected to the terminal flange of another sleeve by means of nuts and bolts. In the case of inwardly directed flanges it may be necessary to form these at a subsequent operation with internal screw threads or similar devices for connecting one sleeve to another sleeve, for instance, by means of an externally screw threaded ferrule adapted to engage with the internal screw threads in the sleeves.

The invention will now be described with reference to the manufacture of such strengthening sleeves by means of a turret lathe, reference being made to the accompanying drawings which illustrate the additional apparatus necessary for carrying out this invention, in which:—

Fig. 1 illustrates diagrammatically the apparatus in this application to a turret lathe.

Fig. 2 is a section on the line II—II in Fig. 1 looking in direction of the arrow.

Fig. 5 is a side elevation, partly in section, of the former plate and the datum plate assembly showing the means for adjustably mounting and clamping the former plate in its adjusted position.

Fig. 6 is a plan view of the former plate and datum plate assembly with the datum plate in section, to show the means for clamping the former plate.

Fig. 7 illustrates diagrammatically an alternative form of sleeve.

Figure 3:
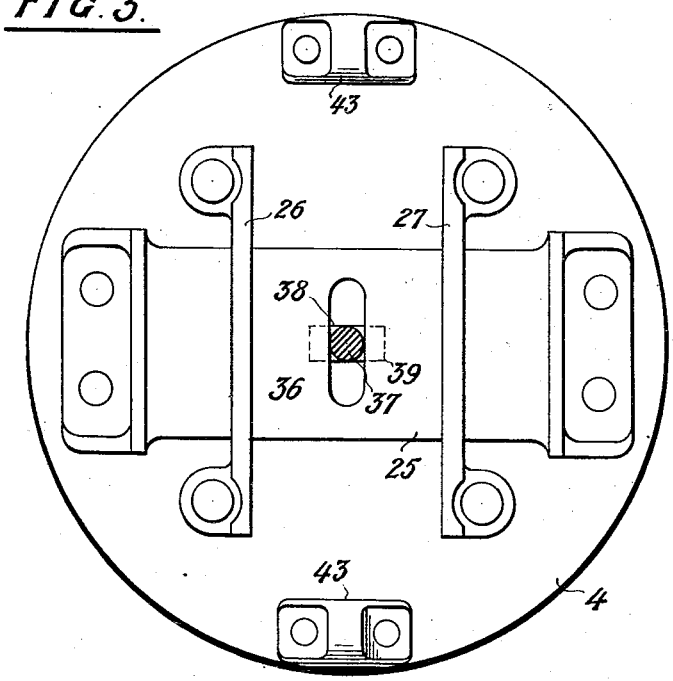
Fig. 3 is a rear elevation of the former plate itself.
Figure 4:
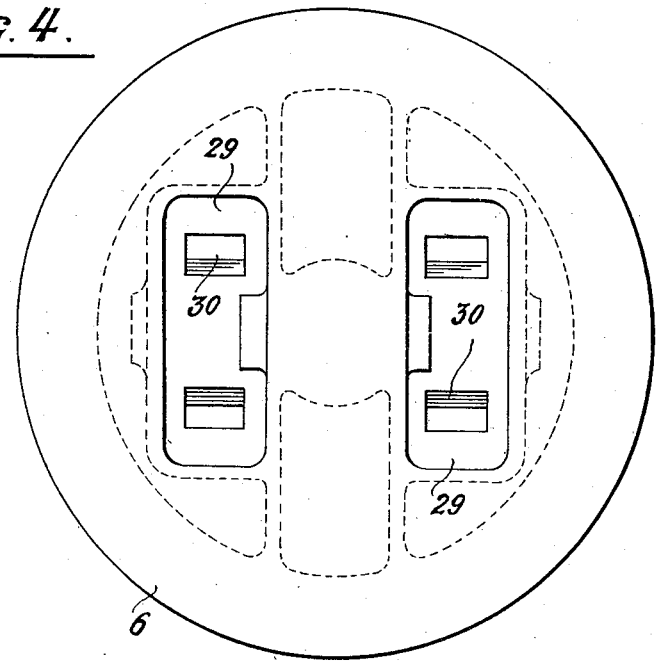
Fig. 4 is a rear view of the datum plate itself.

In carrying out this invention a sleeve blank is first turned from a bar or tube by a turret lathe in the ordinary way and this sleeve blank may, for example, be of the form shown in full lines in Fig. 1 and marked 1. The sleeve blank so formed is then taken and is mounted upon an internal expanding mandrel 2 of any known form, mounted on, and driven from, the headstock marked 3 of the turret lathe.

The former plate 4 mounted on the turret 5 is then brought opposite to and in axial alignment with the sleeve, this former plate being mounted, as will be hereinafter described, on a datum plate 6 in such a manner that the former plate can be adjusted angularly about an axis 7 in the plane of the face of the former plate. The former plate and datum plate assembly are also rotatably mounted by a spindle 8 on an axis coincident with the axis of the sleeve 1 and intersecting the axis 7 on which the former plate is adjustable. The spindle 8 is rotatably mounted in a bearing 9 in the turret 5 and is driven by means of the gear wheels 10 and 11 from a lay shaft 12 which in turn is driven through gear wheels 13 and 14 from the shank of the internal expanding mandrel 2. In this way the lathe headstock drives the former plate synchronously with the sleeve.

The drive from the lathe headstock to the former plate is interrupted during indexing of the turret by moving the turret and with it the gear wheels 13 and 14 in a direction axially of said shaft until the gear wheels 13 and 14 are free of said shaft.

The cutting tool 15 for turning the flanged termination on the sleeve is mounted in a tool carrier 16, mounted to slide freely in the fixed and removable guides 17, 18 on a supporting member 19 fixed to the tool carrier slide 20 of the lathe. The tool carrier 16 is provided at the end opposite the cutting tool with a roller 21 adapted to bear on the face of the former plate and this roller is pressed against the face of the former plate by means of a spring 22 located between projection 23 on the tool carrier and an abutment 24 on the supporting member 19.

If now the face of the former plate is adjusted until this face subtends an angle to the coincident axis of the former plate and sleeve and is clamped in this position and the tool carrier is moved into a position in which the roller will be maintained in contact with the face of the former plate irrespective of the position of the plate relatively to the roller, then by starting the lathe and traversing the tool slide 20 the tool will cut the flange end at an angle which will be parallel to the face of the former plate, as indicated in chain dotted line in Fig. 1 and thus the sleeve will be formed with a flanged termination at the desired angle to the axis of the sleeve. The inner surface of the flange on the sleeve blank may be shaped to correspond with the angled face as indicated in dotted lines in Fig. 1, either in the same operation as that in which the outer face is cut or in a subsequent operation.

The former plate is, as shown in Figs. 3, 5 and 6, of circular form and is provided on its rear face with a bearing 25 struck with a radius from the axis 7 about which the former plate is angularly adjustable and extends diametrally of the plate parallel to said axis. The rear face of the plate is also provided with two sector plates 26 and 27 spaced evenly one on either side of the axis of rotation of the former plate, these sector plates 26 and 27 are also struck with a radius from the axis 7. The bearing 25 is seated on an arcuate bearing surface 28 formed on a projection 29 on the datum plate 6 while the sector plates 26 and 27 are mounted to slide through openings 30 in said projection. The bearing surface 28 only extends partly around the bearing 25 and the sector plates 26 and 27 are provided with elongated arcuate slots 31 through which set pins 32 extend to allow the plate to be angularly adjusted about the axis 7 while being firmly supported. The set pins screw into a boss 33 in the datum plate and are provided with shoulders 34 and washers 35 by which when the screws are tightened the sector plates 26 and 27 of the former plate are clamped rigidly to the datum plate. The bearing 25 and the former plate are formed with a segmental slot 36 through which passes a rod 37 having a T-shaped end piece 38 which fits partly in a rectangular recess 39 in the outer face of the former plate and lies on the axis 7. This rod 37 passes through the spindle 8 (see Fig. 1) and a spring 40 is provided between a projection 41 on the end of this rod and the nut 42 so as, by maintaining the bearing 25 on the surface 28, to hold the former plate frictionally in any adjusted position when this is not clamped to the datum plate.

The former plate is also provided in diametrally opposite positions on its rear face with projections 43 struck by a radius indicated by the arrow $a$ in Fig. 5 from a point on the front face of the datum plate. In this way the angular position of the former plate relatively to the datum plate can be very accurately measured by inserting gauges between the projections 43 and the adjacent surface of the datum plate.

Instead of producing a sleeve with an outwardly directed flange, as shown in Fig. 1, the lathe may, without alteration, produce sleeves with inwardly directed flanges as shown in Fig. 7. In this case the sleeve is mounted in an external expanding mandrel indicated at 44.

What I claim as my invention and desire to secure by Letters Patent is:—

1. Means for producing, by turning, strengthening sleeves for use with tubular members, such sleeves having terminal flanges located at predetermined angles to their axes, comprising a work holder for carrying a sleeve blank from which the strengthening sleeve is to be made, a former plate mounted to rotate on an axis parallel with that of the sleeve blank and angularly adjustable relatively to its axis so that its face can be set at an angle to its axis corresponding to the angle which the axis of the sleeve is to subtend to the plane of the terminal flange, a tool carrier adapted to be reciprocated parallel to the said axis of the former plate and sleeve blank by said former plate and means for rotating the sleeve blank and former plate synchronously, relatively to the tool carrier and means for traversing the tool carrier across the sleeve blank and former plate, while maintaining the tool in a position relative to the axis of the sleeve blank corresponding to the position of the tool carrier relative to the axis of the former plate.

2. Means for producing, by turning, strengthening sleeves for tubular members, such sleeves having terminal flanges located at predetermined angles to their axes comprising, in combination, a turret lathe adapted to shape a piece of metal to form a sleeve blank, a former plate mounted on the turret so that it can be brought opposite to the sleeve blank, mounting means for rotatably mounting said former plate on an axis parallel to the axis of the sleeve blank, adjustment means for angularly adjustably mounting said former plate relatively to its axis so that its face can be set at any one of various angles to its axis corresponding to the angle which the axis of the sleeve is to subtend to the plane of the terminal flange, driving means for causing the former plate and work holder of the lathe to rotate synchronously and follower means for mounting the tool in the tool carrier of the lathe in such a manner that said follower means can be brought against and reciprocated by the former plate parallel to the said axis of the former plate and the tool will be maintained in a position relatively to the axis of the sleeve blank corresponding to the position of the said follower means relative to the former plate while being fed by the tool carrier across the former plate and sleeve blank.

3. Means for producing, by turning, strengthening sleeves for use with tubular members, such sleeves having terminal flanges located at predetermined angles to their axes, comprising a work holder for carrying a sleeve blank from which the strengthening sleeve is to be made, a former plate mounted to rotate on an axis parallel with that of the sleeve blank and angularly adjustable relatively to its axis so that its face can be set at an angle to its axis corresponding to the angle in which the axis of the sleeve is to subtend to the plane of the terminal flange, a tool carrier adapted to be reciprocated by said former plate parallel to the said axis of the former plate and sleeve blank, resilient means for maintaining said tool carrier in contact with said former plate and driving means for rotating the sleeve blank and former plate synchronously relatively to the tool carrier and traversing means for moving the tool carrier across the sleeve blank and former plate, while maintaining the tool in a position relative to the axis of the sleeve blank corresponding to the position of the tool carrier relative to the axis of the former plate.

4. Means for producing by turning, strengthening sleeves for use with tubular members, such sleeves having terminal flanges located at predetermined angles to their axes, comprising a work holder for carrying a sleeve blank from which the strengthening sleeve is to be made, a rotatable and angularly adjustable former plate said plate being mounted to rotate on an axis parallel with that of the sleeve blank and being adjustable relatively to its axis so that its face can be set at an angle to its axis corresponding to the angle which the axis of the sleeve is to subtend to the plane of the terminal flange, a tool carrier adapted to be reciprocated by said former plate parallel to the said axis of the former plate and sleeve blank, a driving shaft, gearing driving said shaft from said work holder, gearing driven by said shaft and driving said former plate synchronously with the sleeve blank relatively to the tool carrier and traversing means for moving the tool carrier across the sleeve blank and former plate, while maintaining the tool in a position relative to the axis of the sleeve blank corresponding to the position of the tool carrier relative to the axis of the former plate.

5. Means for producing, by turning, strengthening sleeves for tubular members, such sleeves having terminal flanges located at predetermined angles to their axes comprising, in combination, a turret lathe adapted to shape a piece of metal to form a sleeve blank, means for mounting said sleeve blank on a headstock of said lathe, a former plate mounted on the turret of said lathe so that it can be brought opposite to the sleeve blank, mounting means for rotatably mounting said former plate on an axis parallel to the axis of the sleeve blank, adjustment means for angularly adjustably mounting said former plate relatively to its axis so that its face can be set at any one of various angles to its axis corresponding to the angle which the axis of the sleeve is to subtend to the plane of the terminal flange, a driving shaft, gearing for driving said shaft from said headstock, gearing for driving said former plate from said shaft whereby the former plate is rotated synchronously with the sleeve blank and follower means for mounting a tool in the tool carrier of the lathe in such a manner that said follower means can be brought against and be reciprocated by the former plate parallel to the said axis of the former plate and the tool will be maintained in a position relatively to the axis of the sleeve blank corresponding to the position of the said follower means relative to the former plate while being fed by the tool carrier across the former plate and sleeve blank.

6. Means for producing, by turning, strengthening sleeves for use with tubular members, such sleeves having terminal flanges located at predetermined angles to their axes, comprising a work holder for carrying a sleeve blank from which the strengthening sleeve is to be made, a former plate mounted to rotate on an axis parallel with that of the sleeve blank and angularly adjustable relatively to its axis so that its face can be set at an angle to its axis corresponding to the angle which the axis of the sleeve is to subtend to the plane of the terminal flange, a fixed datum plate whereby the angular relationship of the former plate to its axis can be accurately determined, a tool carrier adapted to be reciprocated by said former plate parallel to the said axis of the former plate and sleeve blank, means for rotating the sleeve blank and former plate synchronously, relatively to the tool carrier and means for traversing the tool carrier across the sleeve blank and former plate, while maintaining the tool in a position relative to the axis of the sleeve blank corresponding to the position of the tool carrier relative to the axis of the former plate.

7. Means for producing, by turning, strengthening sleeves for tubular members, such sleeves having terminal flanges located at predetermined angles to their axes comprising, in combination, a turret lathe adapted to shape a piece of metal to form a sleeve blank, a former plated mounted on the turret so that it can be brought opposite to the sleeve blank, mounting means for rotatably mounting said former plate on an axis parallel to the axis of the sleeve blank, adjustment means for angularly adjustably mounting said former plate relatively to its axis so that its face can be set at any one of various angles to its axis corresponding to the angle which the axis of the sleeve is to subtend to the plane of the terminal flange, a fixed datum plate whereby the angular relationship of the former plate to its axis can be accurately determined, driving means for causing the former plate and work holder of the lathe to rotate synchronously and follower means for mounting the tool in the tool carrier of the lathe in such a manner that said follower means can be brought against and reciprocated by the former plate parallel to the said axis of the former plate and the tool will be maintained in a position relatively to the axis of the sleeve blank corresponding to the position of the said follower means relative to the former plate while being fed by the tool carrier across the former plate and sleeve blank.

8. Means for producing, by turning, strengthening sleeves for use with tubular members, such sleeves having terminal flanges located at predetermined angles to their axes, comprising a work holder for carrying a sleeve blank from which the strengthening sleeve is to be made, a rotatable former plate mounted to rotate on an axis parallel with that of the sleeve blank and angularly adjustable relatively to its axis so that its face can be set at an angle to its axis corresponding to the angle which the axis of the sleeve is to subtend to the plane of the terminal flange, an axial member in said plate having radially extending parts on the axis about which the former plate is angularly adjustable and serving to support said plate while it is adjusted, a tool carrier adapted to be reciprocated by said former plate parallel to the said axis of the former plate and sleeve blank and means for rotating the sleeve blank and former plate synchronously, relatively to the tool carrier and means for traversing the tool carrier across the sleeve blank and former plate, while maintaining the tool in a position relative to the axis of the sleeve blank corresponding to the position of the tool carrier relative to the axis of the former plate.

9. Means for producing, by turning, strengthening sleeves for use with tubular members, such sleeves having terminal flanges located at predetermined angles to their axes, comprising a work holder for carrying a sleeve blank from which the strengthening sleeve is to be made, a rotatable former plate mounted to rotate on an axis parallel with that of the sleeve blank and having projections with circular surfaces on its rear face, mounting means for said former plate having recesses shaped to correspond with said projections whereby the former plate is angularly adjustable relatively to its axis so that its face can be set at an angle to its axis corresponding to the angle which the axis of the sleeve is to subtend to the plane of the terminal flange, clamping means for fixing said former plate in its adjusted position, a tool carrier adapted to be reciprocated parallel to the said axis of the former plate and sleeve blank by said former plate and means for rotating the sleeve blank and former plate synchronously relatively to the tool carrier and means for traversing the tool carrier across the sleeve blank and former plate, while maintaining the tool in a position relative to the axis of the sleeve blank corresponding to the position of the tool carrier relative to the axis of the former plate.

10. Means for producing, by turning, strengthening sleeves for tubular members, such sleeves having terminal flanges located at predetermined angles to their axes comprising, in combination, a turret lathe adapted to shape a piece of metal to form a sleeve blank, an angularly adjustable former plate mounted on the turret so that it can be brought opposite to the sleeve blank and can be set at any one of various angles to its axis corresponding to the angle which the axis of the sleeve is to subtend to the plane of the terminal flange, said plate having projections with circular surfaces on its rear face, mounting means for rotatably mounting said former plate on an axis parallel to the axis of the sleeve blank and having recesses correspondingly shaped to the projections on said former plate whereby the former plate is angularly adjustable for angularly adjustably mounting said former plate, means for clamping said projections to said mounting means, driving means for causing the former plate and work holder of the lathe to rotate synchronously and follower means for mounting the tool in the tool carrier of the lathe in such a manner that said follower means can be brought against and reciprocated by the former plate parallel to the said axis of the former plate and the tool will be maintained in a position relatively to the axis of the sleeve blank corresponding to the position of the said follower means relative to the former plate while being fed by the tool carrier across the former plate and sleeve blank.

11. Means for producing, by turning, strengthening sleeves for use with tubular members, such sleeves having terminal flanges located at predetermined angles to their axes, comprising a work holder for carrying a sleeve blank from which the strengthening sleeve is to be made, a rotatable former plate mounted to rotate on an axis parallel with that of the sleeve blank and having projections with circular surfaces on its rear face, mounting means for said former plate having recesses correspondingly shaped to said projections whereby said former plate is angularly adjustable relatively to its axis corresponding to the angle which the axis of the sleeve is to subtend to the plane of the terminal flange, an axial member in said former plate having radially extending parts on the axis about which the plate is angularly adjustable and serving to support said plate while it is adjusted, clamping means for fixing said former plate in its adjusted position, a tool carrier adapted to be reciprocated by said former plate parallel to the said axis of the former plate and sleeve blank, synchronous driving means for said sleeve blank and former plate and traversing means for moving the tool carrier across the sleeve blank and former plate, while maintaining the tool in a position relative to the axis of the sleeve blank corresponding to the position of the tool carrier relative to the axis of the former plate.

12. Means for turning inclined surfaces disposed at an angle to the axis of rotation of an object in a lathe or similar tool, comprising means for rotating the object, a tool reciprocable parallel to the axis of rotation and capable of being advanced transversely of said axis as desired, and means for axially reciprocating said tool during each rotation of the object and synchronously therewith a distance for each radial position of the tool, twice the axial distance subtended by the angle between the plane of the surface desired and a line perpendicular to the axis of rotation and intersecting said axis at its point of intersection with said plane.

In witness whereof I have hereunto set my hand.

BARNES NEVILLE WALLIS.